United States Patent [19]

Carmillet

[11] Patent Number: 4,562,636
[45] Date of Patent: Jan. 7, 1986

[54] CLUTCH COVER ASSEMBLY MANUFACTURING METHOD

[75] Inventor: Roger F. L. Carmillet, Paris, France
[73] Assignee: Valeo, Paris, France
[21] Appl. No.: 504,398
[22] Filed: Jun. 15, 1983
[30] Foreign Application Priority Data
  Jun. 21, 1982 [FR] France .................................. 82 10786
[51] Int. Cl.[4] ...................... B21D 39/00; B23P 11/00; B65D 85/68; F16D 13/44
[52] U.S. Cl. .................................... 29/513; 29/526 R; 29/DIG. 3; 192/89 B; 206/335
[58] Field of Search ............... 29/513, 526 R, DIG. 3; 192/70.13, 70.28, 89 B, 99 A, 99 B; 206/319, 325, 335

[56] References Cited

U.S. PATENT DOCUMENTS

| | | | |
|---|---|---|---|
| 2,541,611 | 2/1951 | Reed | 192/99 A X |
| 2,679,304 | 5/1954 | Horn | 29/436 X |
| 2,920,731 | 1/1960 | Zeidler | 192/99 A X |
| 3,489,256 | 1/1970 | Binder et al. | 192/89 B X |
| 3,712,435 | 1/1973 | Kraus | 192/89 B X |
| 3,939,951 | 2/1976 | Sink et al. | 192/89 B |
| 4,069,905 | 1/1978 | de Gennes | 192/89 B X |
| 4,362,230 | 12/1982 | Martinez Corral | 192/70.28 X |
| 4,423,804 | 1/1984 | Kettell et al. | 192/89 B X |

FOREIGN PATENT DOCUMENTS

| | | |
|---|---|---|
| 43683 | 1/1982 | European Pat. Off. |
| 871171 | 4/1942 | France .................... 29/513 |
| 537359 | 6/1941 | United Kingdom . |
| 2032017 | 4/1980 | United Kingdom . |
| 2056591 | 3/1981 | United Kingdom . |

*Primary Examiner*—Howard N. Goldberg
*Assistant Examiner*—Ronald S. Wallace
*Attorney, Agent, or Firm*—Charles E. Brown; Charles A. Brown

[57] ABSTRACT

In a storage configuration of a clutch cover assembly, its pressure plate (14) is immobilized by at least one limiting member (41) comprising two lugs (43, 43') each having two arms (45, 46 (45', 46')). In the method of manufacturing the clutch cover assembly, the lugs (43, 43') are manufactured with a temporary shape (430, 430') and, during assembly, the pressure plate is positioned at an axial distance from the cover corresponding to the storage position. The lugs (43, 43') are then plastically deformed to their final shape.

22 Claims, 11 Drawing Figures

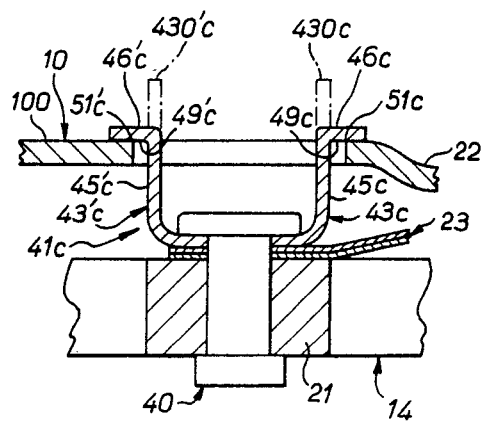
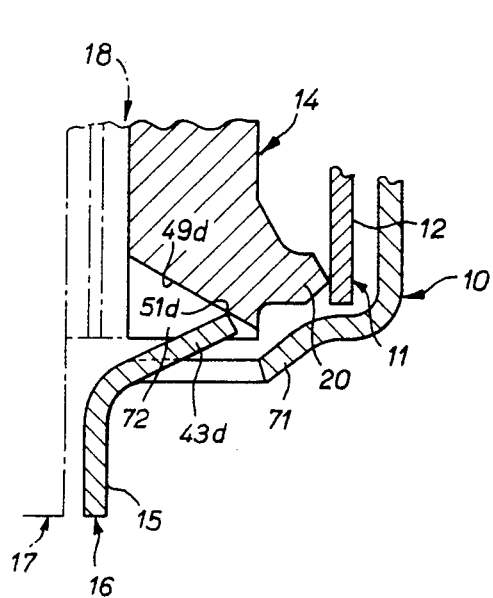
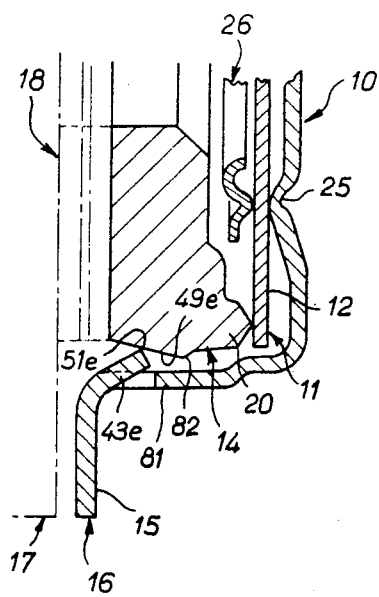

CLUTCH COVER ASSEMBLY MANUFACTURING METHOD

BACKGROUND OF THE INVENTION

1. Field of the Invention

The present invention concerns a method of manufacturing a clutch cover assembly of the kind comprising a pre-assembled combination of an axially fixed part, namely a cover, and a part, namely a pressure plate, which is axially movable under the action of elastic means, means being provided for limiting axial movement of the axially movable part.

The present invention also concerns a clutch cover assembly manufactured by this method.

The invention is more particularly, but not exclusively, concerned with a method of manufacturing a clutch cover assembly in which the means for limiting axial movement of the pressure plate are also adapted to limit radial movement of this plate when the assembly is pre-assembled and stored.

2. Description of the Prior Art

French Patent Application No. 82 10785 describes means for limiting axial and radial movement of the pressure plate. It is known that, following an impact to the edge of the pre-assembled clutch cover assembly in the storage position, caused by dropping it, for example, the pressure plate is acted on by axial and radial forces causing deformation of at least two of the driving straps of the pressure plate, one in bending and the other in buckling.

It is also known that in certain assemblies in the storage position the driving straps are stressed to their maximum elasticity. Deformation in buckling through a few hundredths of a millimeter can thus be prejudicial to their return force properties.

In other kinds of clutch cover assembly, however, it is not necessary to so strictly limit radial movement of the pressure plate and in such cases means for limiting the radial travel of said plate, such as those described in the French patent application mentioned hereinabove, are not needed although, on the other hand, means for limiting axial movement are indispensable to avoiding deformation through a few tenths of a millimeter consequent upon axial movement of the pressure plate.

The implementation of means for limiting either axial movement only or axial and radial movement of the pressure plate may give rise to a number of disadvantages during the assembly of the clutch cover assembly.

Firstly, it must be remembered that the means for limiting axial movement of the pressure plate already known in the prior art are more often than not in the form of a pin attached either to the pressure plate or to the cover and sliding in a hole in the other of these two parts. These pins comprise a cylindrical shoulder the diameter of which is substantially greater than that of the hole, so that this shoulder cooperates with the hole to limit axial movement of the pressure plate.

In the French patent application mentioned hereinabove, it is proposed to provide these pins with a frustoconical shoulder adapted to permit immobilization of the pressure plate in the radial direction in the storage position.

This solution gives satisfaction in many cases, but there nevertheless remain a number of clutch cover assemblies in which it may not be adopted.

There are cases in which such pins cannot be used, whether comprising a cylindrical or a frustoconical shoulder.

The assignees of the present applicants have filed other patent applications covering other means of limiting axial movement of the pressure plate. In the application mentioned hereinabove, the means proposed include cups and a limiting member comprising a limiting arm carried either by the pressure plate or by the cover and cooperating with an edge on the second of the two parts. This solution gives satisfaction in certain cases where pins may not be used.

Nevertheless, there remain a number of cases in which this solution, as disclosed in the application mentioned hereinabove, cannot give complete satisfaction. This is the case, for example, when it is not possible to insert a bulky limiting part into a corresponding opening, the limiting part already having its final shape. It is also the case when the manufacturing tolerances for the various parts of the clutch cover assembly are such that, in order to avoid radial movement of the order of a few hundredths of a millimeter, it would in practice be necessary to provide a part or a member to limit radial movement adapted to each individual clutch cover assembly produced.

SUMMARY OF THE INVENTION

To overcome these disadvantages, the present invention proposes a method of manufacturing a clutch cover assembly comprising a pre-assembled combination of a part which is fixed in the axial direction, a part which is movable in the axial direction, elastic means acting on said axially movable part, and means adapted to limit axial movement of said axially movable part, said limiting means comprising at least one retaining member carried by a first of said parts and at least one limiting member carried by the second of said parts, said limiting member having at least one surface inclined relative to the axial direction, said retaining member having, opposite said inclined surface, at least one edge adapted to immobilize said axially movable part in a storage position by engagement with said surface, and at least one of said limiting and retaining members comprising at least one lug, in which method, during an assembly stage following the fitting of said elastic means, said axially movable part is placed in said storage position and said lug is deformed plastically so that said edge comes into abutment contact with said surface.

By virtue of these arrangements it is possible to manufacture clutch cover assemblies in which the effectiveness of the means for limiting axial or axial and radial movement of the pressure plate is significantly improved as compared with the prior art devices, especially with regard to limitation of radial movement.

Since the various main component parts of the clutch cover assembly are fitted first, namely the cover, pressure plate, diaphragm spring, driving straps and limiting means, and the lug is bent after positioning the pressure plate at an axial distance from the cover corresponding to the storage position of the cover assembly, the limiting surface necessarily comes into intimate contact with the retaining edge, irrespective of the manufacturing tolerances and the actual position of the pressure plate during assembly.

Also, due note should be taken of the low cost of the operation consisting in the bending of the lug, since it is the clutch cover assembly itself in its storage position which acts as the template for such bending. The overall cost of producing a clutch cover assembly using the method in accordance with the invention is practically the same as that of the prior art method, and may even be reduced as compared with the use of certain prior art arrangements, such as those described hereinabove, for example.

In a first family of embodiments, the limiting member is in the form of a part carrying said lug, which comprises two arms linked by an elbow. The limiting member is carried either by the cover or by the pressure plate and cooperates with an edge of an opening formed in the other part.

The implementation of this family of embodiments is particularly simple and inexpensive.

In a second family of embodiments, the lugs carrying the retaining edges are cut out from the skirt of the cover and cooperate with limiting surfaces on the edge surface of the pressure plate.

This second family of embodiments is also of particular simplicity in implementation and its cost is also extremely low.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 9 is a view corresponding to FIG. 3 and showing a yet further embodiment.

FIGS. 10 and 11 are partial views corresponding to FIG. 2 and showing two still further embodiments of a clutch cover assembly manufactured by the method in accordance with the present invention.

DESCRIPTION OF THE PREFERRED EMBODIMENTS

Figure 1:
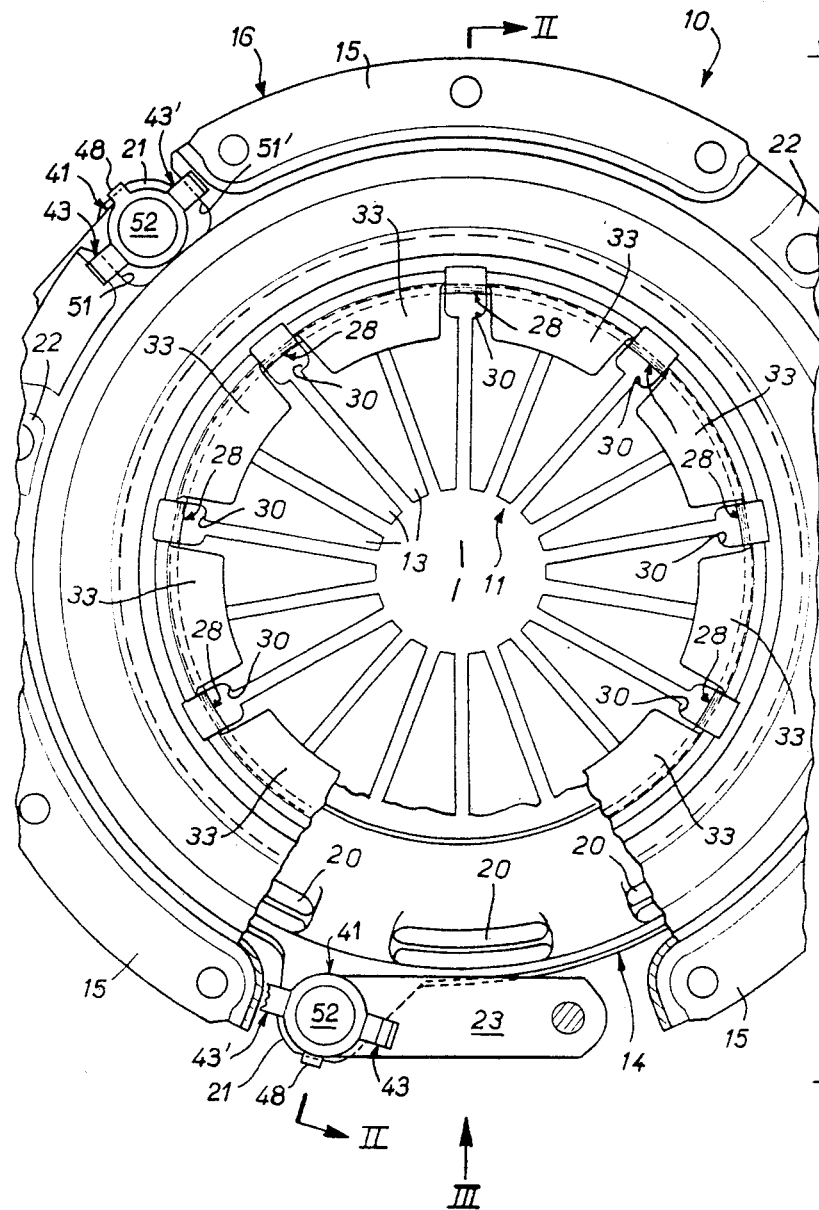
FIG. 1 is a view in elevation along the arrow I in FIG. 2 of a clutch cover assembly manufactured by the method in accordance with the present invention.

In the embodiment shown in FIGS. 1 to 4, the diaphragm spring clutch cover assembly in accordance with the invention generally comprises a first generally annular part or cover 10, a second generally annular part or diaphragm spring 11 which has a peripheral part 12 constituting a Belleville washer and a central part subdivided into radial fingers 13, assembly means pivotally connecting diaphragm spring 11 to cover 10 and described in detail hereinafter, and a third annular part or pressure plate 14 which is constrained to rotate with cover 10 while being movable relative thereto in the axial direction as will be specified hereinafter, and on which the peripheral part of diaphragm spring 11 constituting Belleville washer 12 bears. This combination of parts is generally pre-assembled and stored prior to final assembly.

Figure 2:
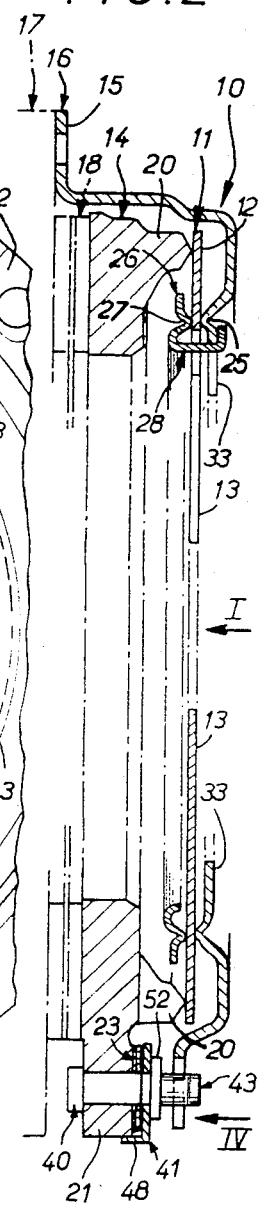
FIG. 2 is a view of the clutch cover assembly in cross-section on the line II—II in FIG. 1.

Cover 10 has areas 15 on a peripheral radial rim 16 by virtue of which it is adapted to be mounted on a pressure plate or flywheel 17 shown schematically for purposes of illustration in chain-dotted line in FIG. 2 and which is constrained to rotate with a first shaft, in practice a driving shaft, with a friction disk 18 between reaction plate 17 and pressure plate 14. Friction disk 18 is also schematically represented in chain-dotted line in FIG. 2, and is constrained to rotate with a second shaft, in practice a driven shaft.

To permit action of diaphragm spring 11, pressure plate 14 has spaced axial bosses 20 on which bears the peripheral part of diaphragm spring 11 constituting Belleville washer 12.

The periphery of the pressure plate has spaced radially projecting lugs 21 from which and to areas 22 of peripheral rim 16 of cover 10 extend, substantially tangentially to a circumference of the assembly, drive straps 23 constraining it to rotate with cover 10 while permitting it to move in the axial direction. These straps are riveted to the cover and to the plate.

These arrangements are well known per se and as they do not constitute part of the present invention they will not be described in more detail here.

Cover 10 provides a first or primary support for diaphragm spring 11, more specifically for the peripheral part thereof constituting Belleville washer 12, at the internal periphery of this peripheral part. In the embodiment shown, it has to this end an annular half-wave-shaped deformation forming a first support ring 25 (FIG. 2).

The assembly means pivotally coupling diaphragm spring 11 to cover 10 comprise a fourth annular part or ring 26 providing a circular second or secondary support for diaphragm spring 11, on the side thereof opposite cover 10, having to this end in the embodiment shown, in line with half-wave-shaped deformation 25 of cover 10, a comparable half-wave-shaped deformation 27; it further comprises integral retaining lugs 28 which are flat and thin and by means of which it is coupled to cover 10. Each lug 28 passes through a respective opening 30 in diaphragm spring 11.

Retaining lugs 28, of which there are nine in this embodiment, are thus integral with ring 26, the combination being formed, for example, by appropriately bending and cutting a single blank.

Cover 10 has lugs 33 adapted to limit distension of diaphragm spring 11 between retaining lugs 28.

The combination of the four generally annular parts is generally pre-assembled and stored prior to mounting on the pressure plate.

Figure 3:
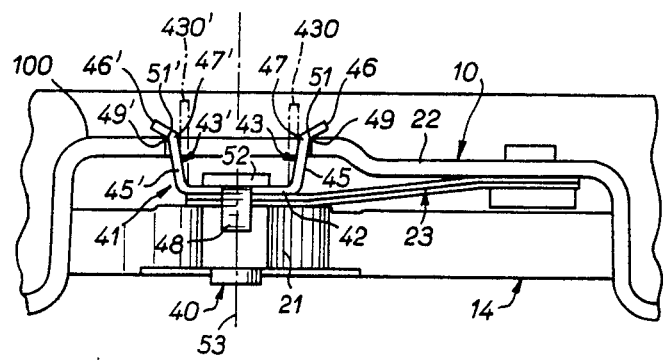
FIG. 3 is a partial view of the clutch cover assembly along the arrow III in FIG. 1.

There will be now be described, with reference to FIGS. 2 to 4, one embodiment of the means for limiting axial and radial movement of the pressure plate, the description presupposing that the clutch cover assembly is in the pre-assembled state but not yet bolted to the reaction plate.

Each strap 23, consisting in this instance of a pair of thin plates, is riveted to lug 21 by means of a rivet 40 which comprises a head 52 and also couples to lug 21 a limiting member 41.

Figure 5:
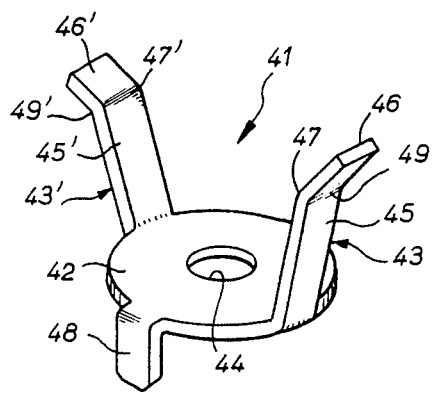
FIG. 5 is a perspective view of a limiting member.

The limiting member is shown in FIG. 5. It comprises a substantially circular flat supporting part 42 with a central hole 44. It has two lugs 43, 43', each comprising two arms 45, 46 (45', 46') linked by an elbow 47 (47'). It further comprises a rotation blocking arm 48 extending in a plane substantially perpendicular to that of part 42.

Arms 45, 45' are inclined relative to the direction of the axis of the assembly. Arms 46, 46' are at a still larger angle to this axis (see parallel axis 53 in FIG. 3).

Figure 4:
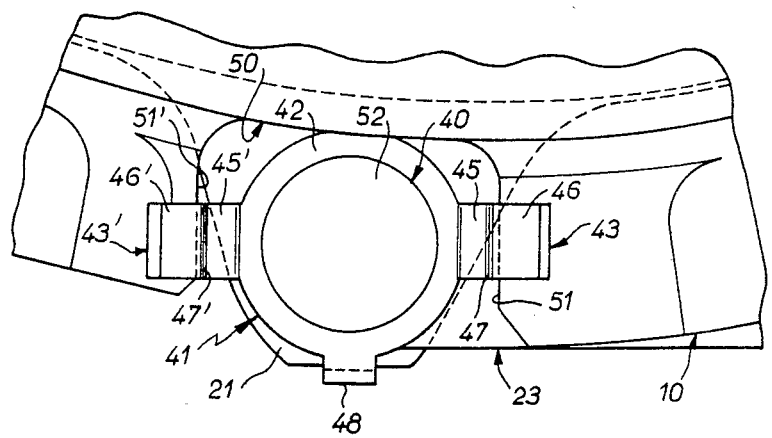
FIG. 4 is a partial plan view to a larger scale along the arrow IV in FIG. 2.

For the purposes of cooperation with limiting member 41, the cover is formed with notches 50 each of which, in this embodiment, has two retaining edges, 51, 51' (FIGS. 1 and 4).

There will now be described, with reference to FIG. 3, the steps of the method of manufacturing the clutch cover assembly in accordance with the invention. The steps preceding those to be described and those following them, and in particular the formation of a cover/diaphragm spring/assembly means subassembly, are well known to those skilled in the art and, as they do not form part of the present invention, will be described in detail here.

In accordance with the present invention, limiting member 41 is not formed to its final shape during its manufacture. It may be formed, for example, from a single steel blank which is cut out and shaped so that lug 48 is in its final position as shown in FIGS. 2 and 5 whereas lugs 43, 43' are straight and parallel to the axis of the mechanism, in the position represented in FIG. 3 by the chain-dotted lines 430, 430'.

The assembly of the various component parts of the clutch cover assembly, shown by way of example in FIGS. 1 to 4, proceeds in a manner known per se except that during the fitting of straps 23 to lugs 21 limiting members 41 are fitted with their lug 43 in the configuration shown at 430, 430' and members 41 and straps 23 are riveted to lugs 21.

In accordance with the invention, the pressure plate is then disposed in the storage position, that is to say it is separated from the cover by an axial distance corresponding to the required extension of drive straps 23 and diaphragm spring 11 while in storeage. Lugs 43, 43' of members 41 are then bent, that is to say plastically deformed, so as to change them from the configuration shown at 430, 430' to that shown in full line in FIG. 3, so that each lug 43, 43' comprises two arms 45 (45') and 46 (45') linked by an elbow 47 (47').

One characteristic of the present invention is that retaining edges 51, 51' are used in this embodiment as a template for shaping elbows 47, 47'.

During the shaping of arm 43 (43'), an inclined curved surface 49 (49') is formed inside elbeow 47 (47'). This surface 49 (49') cooperates with edge 51 (51') so as to lock the pressure plate in the storage position axially and radially. An additional advantage of this device is that it permits ready automatic disengagement of members 41 from notches 50 during bolting of the clutch cover assembly to the reaction plate. It should also be noted that this method provides for compensating a small number of minor defects in certain parts, such as a certain degree of lack of parallelism, by effectively immobilizing the pressure plate through the appropriate bending of arms 46, 46'.

Note that, by virtue of the method in accordance with the invention, in the storage position there is always concomitant cooperation of inclined curved surface 49 with retaining edge 51 and inclined surface 49' with retaining edge 51', which prevents unacceptable buckling of the straps in the event of an impact. In effect, retaining edge 51 is on the downstream side of rivet 40 in the normal direction of rotation of the assembly, whereas retaining edge 51' is on its upstream side. In the event that only edge 51' cooperates with surface 49' in the storage position, while there is clearance between surface 49 and edge 51, there may occur unacceptable buckling of the straps in the event of shock, by reaction. By virtue of the method in accordance with the invention, such buckling cannot occur since the bending of arms 46, 46' is effected in situ to ensure the concomitant cooperation of surface 49 with edge 51 and of surface 49' with edge 51'.

Note also that lug 48 locks onto the edge of the pressure plate so as to block rotation of member 41, the edge of lug 21 being formed with a flat for this purpose.

MODIFICATIONS

Figure 6:
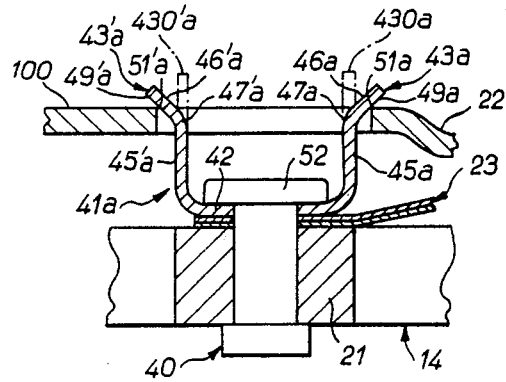
FIG. 6 is a view corresponding to FIG. 3 and showing an alternative embodiment.

FIG. 6 shows another embodiment of member 41. In this and subsequent figures, parts similar to those shown in FIGS. 1 to 5 bear the same reference numerals. Limiting member 41a also comprises a flat part 42 and a rotation blocking lug 48 (not shown in FIG. 6). It comprises two lugs 43a, 43'a each comprising arms 45a, 45'a and 46a, 46'a linked by an elbow 47a, 47'a.

As with member 41, lugs 43a, 43'a are not formed to their final shape during the manufacture of members 41a. In fact, in this embodiment, only arms 46a, 46'a are not bent, arms 46a, 46'a having the configuration shown in FIG. 6 by chain-dotted lines 430a, 430'a.

During assembly of the clutch cover assembly, after placing the pressure plate in the storage position, lugs 43a, 43'a are bent, that is to say arms 46a, 46'a are formed to their final shape, the external surface 49a, 49'a of arms 46a, 46'a coming into contact with restraining edges 51a, 51'a. Here again, as in the previous embodiment, unacceptable buckling of the straps in response to impact is avoided.

Figure 7:
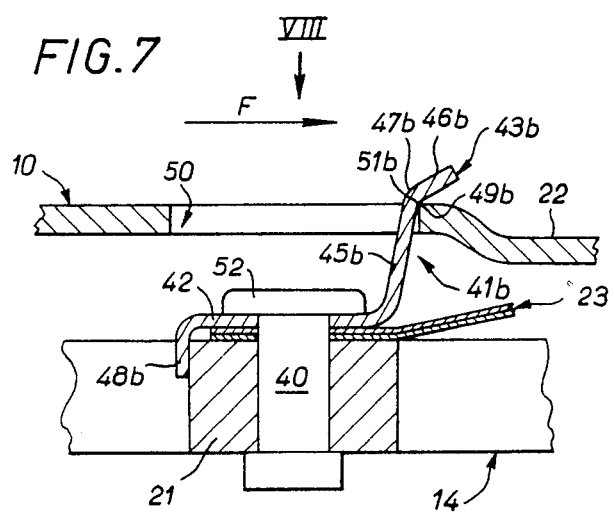
FIGS. 7 and 8 are views corresponding to FIGS. 3 and 4 and showing a further embodiment.
Figure 8:
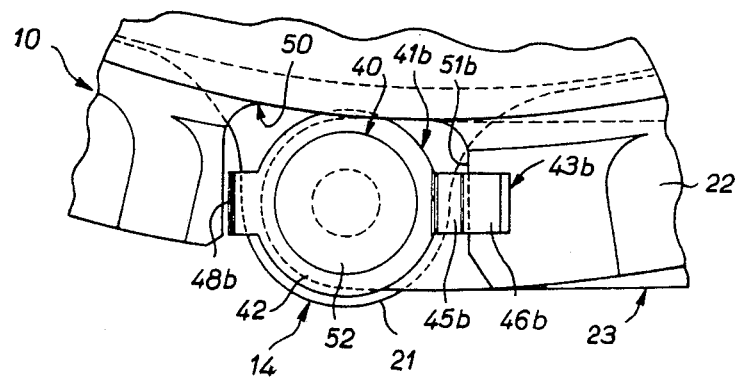

A further embodiment is shown in FIGS. 7 and 8. In this embodiment, limiting members 41b have only one lug 43b identical to that shown in FIG. 6, that is to say comprising two arms 45b and 46b linked by an elbow 47b. Here, rotation blocking arm 48b is diametrically opposite lug 43b. 43b is shaped in exactly the same manner as already described with reference to FIG. 3.

Note that edge 51b which cooperates with surface 49b of lug 43 is situated on the side determined by the arrow F corresponding to the normal direction of rotation of the clutch cover assembly, so that in the abutment position of surface 49 strap 23 is loaded in tension. In other words, restraining edge 51b is on the downstream side of rivet 40 in the normal direction of rotation, which is favorable in the event of impact.

It is naturally possible to conceive of other embodiments of member 41 within the principle of FIGS. 3 to 8.

Thus in FIG. 9, limiting member 41c also comprises two lugs 43c, 43'c each comprising two arms 45c, 46c (45'c, 46'c), arm 46c (46'c) being at a right angle to arm 45c (45'c) in the active position.

This bending is obtained using the method in accordance with the present invention by deforming lugs 43c, 43'c during assembly so as to alter them from the shape shown at 430c, 430'c in FIG. 9 to that shown in full line.

In this embodiment, it is the outside surface 49c, 49'c of arms 46c, 46'c which constitutes the limiting inclined surface opposite retaining edge 51c, 51'c. In this embodiment, by virtue of the right-angle bending of arms 46c, 46'c, concomitant surfaces 49c and 49'c are fully in contact with the surface 100 of cover 10. The pressure plate is axially retained, as previously, but radial retention is obtained by virtue of friction between surfaces 49c, 49'c and surface 100 of cover 10.

Naturally, as in the previous embodiments, a number of limiting members are provided to ensure proper retention of the pressure plate in the event of impact.

There will now be described with reference to FIGS. 10 and 11 another family of embodiments of clutch cover assemblies manufactured using the method in accordance with the present invention.

FIGS. 10 and 11 are partial views corresponding to part of FIG. 2. Parts common to the three figures have the same reference numerals and will not be described again.

In FIG. 10, the retaining member consists of the edges 51*d* of inclined lugs 43*d* cut out from the peripheral skirt 71 of cover 10. The limiting member corresponding to each of the restraining members consists of a surface 49*d* inclined relative to the direction of the axis of the mechanism of a cut-out 72 in the pressure plate in line with lugs 43*d*.

In FIG. 11, the outside edge surface 82 of pressure plate 14 comprises a frustoconical surface 49*e* constituting a limiting member. This limiting member cooperates with spaced lugs 43*e* cut out from skirt 81 of cover 10, and having an edge 51*e* constituting a retaining member. The foregoing arrangements are of particular advantage when there is a requirement not to use neighboring regions of the drive straps for the provision of the retaining and limiting members.

The method of manufacturing the clutch cover assembly shown in FIGS. 10 and 11 is in principle similar to that for the assemblies shown in FIGS. 3 to 9.

In these embodiments, lugs 43*d* (43*e*) are appropriately cut out from peripheral skirt 71 (81) of cover 10. During the assembly steps following the fitting of diaphragm spring 11, pressure plate 14 is placed in the storage position, that is to say spaced from the cover by the axial distance required in the storage position. Lugs 43*d* (43*e*) are then bent, that is to say plastically deformed so as to alter them from their original shape in which they were in the same curved plane as peripheral skirt 71 (81) of the cover to that shown in FIGS. 10 and 11 in which edge 51*d* (51*e*) is in contact with surface 49*d* (49*e*).

In these embodiments, the pressure plate is retained in the storage position axially and radially and there is readily achieved automatic disengagement of pressure plate 14 from lugs 43*d* during mounting of the clutch cover assembly on the reaction plate. Note that it is possible to compensate a certain degree of lack of parallelism between the pressure plate and the cover by effectively immobilizing the pressure plate in the required storage position by appropriate bending of lugs 43*d* (43*e*). Note that to this end, surfaces 49*d* (49*e*) serve as templates for such bending.

It will be understood that various changes in the details, materials and arrangements of parts, which have been herein described and illustrated in order to explain the nature of the invention, may be made by those skilled in the art within the principle and scope of the invention as expressed in the appended claims.

Conceivable further embodiments remain within the spirit and scope of the invention if a limiting inclined surface of a limiting member is brought into opposed relationship with a retaining edge by plastic deformation during assembly.

In the embodiment shown in FIGS. 3 to 9, the limiting member is carried by the pressure plate and cooperates with an edge formed on the cover. It will be obvious that the opposite arrangement may be used, namely a retaining member such as member 41 attached to the cover and cooperating with an appropriately formed edge on the pressure plate.

Similarly, the elastic means may comprise coil springs in the manner known per se, rather than a diaphragm spring.

It will be obvious that the number of limiting members associated with each clutch cover assembly depends on its configuration. To ensure proper retention of the pressure plate, it is always necessary to provide more than one limiting member.

I claim:

1. A method of making a clutch cover assembly comprising the steps of:

providing component parts of the cover assembly having an axis and comprising a cover, a pressure plate and elastic means axially biasing the pressure plate toward a storage position, means for connecting the pressure plate for rotation with the cover and for permitting axial displacement of the pressure plate relative to the cover, a retaining member on a selected one of the pressure plate and the cover, the retaining member having a retaining edge, a limiting member on the other one of the pressure plate and the cover, the limiting member having a limiting surface cooperable with the retaining edge for defining the storage position for the pressure plate, a selected one of the limiting member and the retaining member comprising a lug;

assembling the component parts together including securing the elastic means to the cover;

after securing the elastic means to the cover, placing the pressure plate in the storage position; and plastically deforming the lug to bring the retaining edge and the limiting surface into abutting relation therewith while holding the pressure plate in the storage position, with the lug thereupon defining the storage position of the pressure plate.

2. A method according to claim 1, the limiting surface being an inclined surface with respect to the axis of the cover assembly.

3. A method according to claim 2, wherein the limiting member comprises the lug.

4. A method according to claim 3, wherein the lug is plastically deformed to bring the limiting surface into wedging engagement with the retaining edge.

5. A method according to claim 3, wherein the lug is plastically deformed by bending, to form a first arm and a second arm at an angle to the first arm, the limiting surface being formed between a resulting bend between the first and second arms and the free end of the second arm.

6. A method according to claim 5, wherein the first arm extends substantially axially of the cover assembly.

7. A method according to claim 5, wherein the first arm is inclined relative to the axis of the assembly.

8. A method according to claim 5, wherein the lug is plastically deformed by bending it around the retaining edge on the selected one of the pressure plate and the cover.

9. A method according to claim 1, wherein the lug is plastically deformed to bring the limiting surface into wedging engagement with the retaining edge.

10. A method according to claim 1, wherein the retaining edge is defined on the lug, the lug being struck out of a peripheral wall of the cover, and said limiting surface being inclined relative to the axis of the cover assembly and formed on the pressure plate.

11. A method according to claim 10, wherein the lug is plastically deformed by bending it around the retaining edge on the selected one of the pressure plate and the cover.

12. A method according to claim 1, wherein the limiting member is carried by the pressure plate.

13. A method according to claim 12, wherein the lug is plastically deformed by bending, to form a first arm and a second arm at an angle to the first arm, the limiting surface being formed between a resulting bend between the first and second arms and the free end of the second arm.

14. A method of making a clutch cover assembly comprising the steps of:
 providing component parts of the cover assembly having an axis and comprising a cover, a pressure plate and elastic means axially biasing the pressure plate toward a storage position, means for connecting the pressure plate for rotation with the cover and for permitting axial displacement of the pressure plate relative to the cover, a retaining member on a selected one of the pressure plate and the cover, the retaining member having a retaining edge, a limiting member on the other one of the pressure plate and the cover, the limiting member having a limiting surface cooperable with the retaining edge for defining the storage position for the pressure plate, a selected one of the limiting member and the retaining member comprising a lug;
 assembling the component parts together including securing the elastic means to the cover;
 after securing the elastic means to the cover, placing the pressure plate in the storage position; and
 plastically deforming the lug to bring the retaining edge into wedging engagement with the limiting surface while holding the pressure plate in the storage position for axially and radially restraining the pressure plate relative to the cover and thereby defining the storage position for the pressure plate.

15. A method according to claim 14, wherein the limiting member is carried by the pressure plate.

16. A method according to claim 14, wherein the limiting member comprises the lug.

17. A method according to claim 14, wherein the retaining edge is defined on the lug, the lug being struck out of a peripheral wall, the cover and said limiting surface being inclined relative to the axis of the cover assembly and formed on the pressure plate.

18. A method of making a clutch cover assembly comprising the steps of:
 providing component parts of the cover assembly having an axis and comprising a cover, a pressure plate and elastic means axially biasing the pressure plate toward a storage position, means for connecting the pressure plate for rotation with the cover and for permitting axial displacement of the pressure plate relative to the cover, a retaining member on a selected one of the pressure plate and the cover, the retaining member having a retaining edge, a limiting member on the other one of the pressure plate and the cover, the limiting member having a limiting surface cooperable with the retaining edge for defining the storage position for the pressure plate, the limiting member comprising at least one lug comprising a first arm and a second arm and a bend joining the second arm to the first arm, the limiting surface being formed between the bend and the free end of the second arm;
 assembling the component parts together including securing the elastic means to the cover;
 after securing the elastic means to the cover, placing the pressure plate in the storage position; and
 plastically deforming the lug by bending to form the bend between the first and second arms while holding the pressure plate in the storage position.

19. A method according to claim 18, wherein the first arm extends substantially axially.

20. A method according to claim 18, wherein the first arm is inclined relative to the axis of the cover assembly.

21. A method according to claim 18, wherein the lug is plastically deformed by bending it around the retaining edge.

22. A method of making a clutch cover assembly comprising the steps of:
 providing component parts of the cover assembly having an axis and comprising a cover, a pressure plate and elastic means axially biasing the pressure plate toward a storage position, means for connecting the pressure plate for rotation with the cover and for permitting axial displacement of the pressure plate relative to the cover, a retaining member on a selected one of the pressure plate and the cover, the retaining member having a retaining edge, a limiting member on the other one of the pressure plate and the cover, the limiting member having a limiting surface cooperable with the retaining edge for defining the storage position for the pressure plate, the limiting member comprising at least one lug comprising a first arm and a second arm and a bend joining the second arm to the first arm, the limiting surface being formed between the bend and the free end of the second arm;
 assembling the component parts together including securing the elastic means to the cover;
 after securing the elastic means to the cover, placing the pressure plate in the storage position; and
 plastically deforming the lug around the retaining edge to form the first and second arms and the bend therebetween.

* * * * *